US012665249B2

(12) United States Patent
Muelberger et al.

(10) Patent No.: US 12,665,249 B2
(45) Date of Patent: Jun. 23, 2026

(54) CELL HOLDER FOR AT LEAST ONE BATTERY CELL AND CELL MODULE

(71) Applicant: Mercedes-Benz Group AG, Stuttgart (DE)

(72) Inventors: Anselm Muelberger, Wernau (DE); Holger Rothenburger, Lauffen (DE)

(73) Assignee: Mercedes-Benz Group AG, Stuttgart (DE)

( * ) Notice: Subject to any disclaimer, the term of this patent is extended or adjusted under 35 U.S.C. 154(b) by 611 days.

(21) Appl. No.: 18/002,369

(22) PCT Filed: Jun. 8, 2021

(86) PCT No.: PCT/EP2021/065365
§ 371 (c)(1),
(2) Date: Dec. 19, 2022

(87) PCT Pub. No.: WO2022/002541
PCT Pub. Date: Jan. 6, 2022

(65) Prior Publication Data
US 2023/0231252 A1      Jul. 20, 2023

(30) Foreign Application Priority Data

Jun. 29, 2020     (DE) ..................... 10 2020 003 892.1

(51) Int. Cl.
*H01M 50/211*        (2021.01)
*H01M 10/613*        (2014.01)
(Continued)

(52) U.S. Cl.
CPC ....... *H01M 50/211* (2021.01); *H01M 10/613* (2015.04); *H01M 10/659* (2015.04);
(Continued)

(58) Field of Classification Search
None
See application file for complete search history.

(56) References Cited

U.S. PATENT DOCUMENTS 4,673,240 A  *  6/1987  Byfield, Jr. ......... H01M 50/567
                                                            411/389
8,790,810 B2     7/2014  McLaughlin et al.
(Continued)

FOREIGN PATENT DOCUMENTS

DE      10 2010 012 935 A1      9/2011
DE      10 2012 222 732 A1      6/2013
(Continued)

OTHER PUBLICATIONS

Machine English translation of JP2010010460A originally published to Katsube Jan. 14, 2010 (Year: 2010).*
(Continued)

*Primary Examiner* — Mary Grace Byram
(74) *Attorney, Agent, or Firm* — Crowell & Moring LLP

(57) ABSTRACT
A cell holder for a battery cell includes an intake in which the battery cell is receivable. The cell holder is stackable with additional cell holders in a module frame in which a battery that has a plurality of battery cells is receivable. The cell holder is guidable in the module frame relative to the module frame by a guiding device.

8 Claims, 1 Drawing Sheet

(51) Int. Cl.
  *H01M 10/659* (2014.01)
  *H01M 50/20* (2021.01)
  *H01M 50/289* (2021.01)

(52) U.S. Cl.
  CPC ......... *H01M 50/20* (2021.01); *H01M 50/289*
  (2021.01); *Y02E 60/10* (2013.01)

(56) References Cited

U.S. PATENT DOCUMENTS

| | | | |
|---|---|---|---|
| 2012/0003520 A1* | 1/2012 | Lee | H01M 50/211 |
| | | | 429/83 |
| 2013/0011718 A1* | 1/2013 | Hsiao | H01M 50/502 |
| | | | 429/159 |
| 2013/0196211 A1* | 8/2013 | Park | H01M 50/538 |
| | | | 429/156 |
| 2014/0120391 A1 | 5/2014 | Park | |
| 2017/0093000 A1* | 3/2017 | Smith | H01M 10/6569 |
| 2018/0123105 A1* | 5/2018 | Tokoo | H01M 10/613 |
| 2021/0057794 A1* | 2/2021 | Moon | H01M 50/20 |
| 2021/0280926 A1* | 9/2021 | Jansen | H01M 50/284 |

FOREIGN PATENT DOCUMENTS

| | | |
|---|---|---|
| DE | 10 2013 002 877 A1 | 9/2014 |
| DE | 10 2013 021 549 A1 | 6/2015 |
| DE | 10 2014 019 092 A1 | 6/2016 |
| DE | 11 2015 002 135 B4 | 3/2017 |
| JP | 5-159768 A | 6/1993 |
| JP | 2008-47371 A | 2/2008 |
| JP | 2010-10460 A | 1/2010 |
| JP | 2010-123412 A | 6/2010 |
| JP | 2013-12458 A | 1/2013 |
| JP | 2015-5362 A | 1/2015 |

OTHER PUBLICATIONS

PCT/EP2021/065365, International Search Report dated Oct. 4, 2021 (Two (2) pages).

German-language German Office Action issued in German application No. 10 2020 003 892.1 dated Mar. 11, 2021 (Seven (7) pages).

Wikipedia, "Sliding Guide", URL: https://de.wikipedia.org/wiki/Gleitf%C3%Bhrung, Aug. 25, 2018, (Two (2) pages), German-language.

Japanese-language Japanese Office Action issued in Japanese Application No. 2022-575479 dated Jan. 18, 2024 (3 pages).

* cited by examiner

CELL HOLDER FOR AT LEAST ONE BATTERY CELL AND CELL MODULE

BACKGROUND AND SUMMARY OF THE INVENTION

The invention relates to a cell holder for at least one battery cell and a cell module.

DE 10 2014 019 092 A1 discloses a cell holder for receiving an individual cell, having cell tabs arranged on the flat surface. A support element for supporting angled cell tabs is provided in an outer side surface of the cell holder. This individual cell is a flat cell in a so-called coffee bag or pouch cell construction. An electrochemically active cell interior is here surrounded by an electrically isolating composite foil as a cell housing. The cell holder is provided in order to mechanically fix these individual cells, which have a comparatively unstable cell housing due to the composite foils. This cell holder is arranged between two individual cells, and surrounds them at their edges, wherein individual cells and the cell holder form a cell block that is a component of an electric battery.

The object of the present invention is to create a cell holder for at least one battery cell and a cell module that enable a particularly advantageous protection of received battery cells.

The invention relates to a cell holder for at least one battery cell that provides an intake in which the at least one battery cell can be received. This intake is formed open in at least one direction, whereby a volume change of a battery cell received in the intake is enabled. The cell holder can further be stacked with further cell holders in a module frame, whereby a battery comprising several battery cells can be provided. The battery is in particular a vehicle battery, by means of which an electric motor vehicle can be driven. The battery cell is in particular a so-called pouch cell. The term pouch cell here simply describes the technical construction of the battery cell. Stacked or folded active layers of a flexible outer foil are included in pouch cells. Several individual electric pouch cells can be stacked in order to be interconnected with each other in a series connection or in a parallel connection. Cell tabs project from the outer foil of the respective pouch cell as connection electrodes. It is provided that particularly little is mechanically required of the battery cells in order to keep a danger of damage for the battery cells, particularly their outer foil, particularly low. It is provided according to the invention that the cell holder has a guiding device, by means of which the cell holder can be guided in the module frame relative to the module frame, in order, on the one hand, to enable a particularly advantageous protection of the respective battery cells and, on the other, to enable a change of volume of the battery cells over their lifecycle or over their charging cycle. The ability of the cell holder to be guided relative to the module frame via the guiding device enables a volume change of the at least one battery cell received by means of the cell holder to be balanced via a relative movement of the cell holder to the module frame, whereby a mechanical requirement of the battery cell can be kept particularly low during the volume change. In the case of a stacked arrangement of several cell holders in particular, in which at least one battery cell is respectively received, the cell holders can be moved independently of each other relative to the module frame via their guiding device, whereby the cell holders can be moved relative to each other. A battery cell received in a first intake of a first cell holder here abuts on a wall of a second cell holder stacked on the first cell holder. This wall of the second cell holder covers the open side of the intake of the first cell holder. The battery cell arranged in the intake along a stacking direction of the cell holder is thus covered by the first cell holder in a first direction, and by the second cell holder in a second direction. If at least one of the battery cells received in at least one of the cell holders expands, then the cell holder receiving the battery cell and a further cell holder abutting on the battery cell can be pushed apart via the expansion of the battery cell. As a consequence of the cell holders being pushed apart, a movement of the cell holders relative to each other occurs, which is enabled via the respective guiding devices of the cell holders, via which the cell holders can respectively be moved relative to the module frame. A pressure build-up in the battery cell can be restricted, or at least weakened via the movement of the cell holders relative to each other as a consequence of the increase in volume. A pressure load of the at least one battery cell received in the cell holder can thus be kept particularly low. A danger of damage for the at least one battery cell received in the cell holder can thus be kept particularly low.

In a development of the invention, a bending edge can be provided, in which a cell tab of the received battery cell can be bent. The bent cell tab can be connected to a cell tab of a further battery cell, wherein the battery cells can be connected in series or in parallel. A particularly compact construction of a battery comprising several cell holders and several battery cells can be attained via bending the cell tab.

In this context, it has proved particularly advantageous if on the bending edge, a metal insert is provided, on which the cell tab can abut, and via which the cell tab can be connected to the cell holder in a firmly bonded manner. This means that the metal insert, on which the at least one cell tab can abut around the bending edge during bending, is arranged on the bending edge. In order to ensure that the respective at least one battery cell is particularly securely held on the cell holder, the cell holder can be connected to the metal insert in a firmly bonded manner, can in particular be welded. Via the firmly bonded connection, it can be ensured that the cell tab is securely fixed in position on the cell holder. A particularly simple, secure interconnection of several battery cells that are received in different cell holders can thus occur.

In further embodiments of the invention, it has proved advantageous if the guiding device is formed as a dovetail guide. The dovetail guide is equipped to form a sliding guide with the module frame. The dovetail guide is equipped to enter into a dovetail connection with the module frame for this sliding guide. A form-fit connection between the cell holder and the module frame can be provided via the dovetail connection. Thus, on the one hand, the cell holder can be particularly securely held on the module frame via the dovetail guide, and on the other, the dovetail guide enables a movement of the cell holder relative to the module frame to be particularly precisely guided.

In a further embodiment of the invention, it has proved advantageous if at least one wall delimiting the intake is provided by a metal component, on which the battery cell can abut in its state received in the intake. The battery cell received in the intake can thus be in contact with the metal component. The metal component has a particularly high heat conductivity, and enables a particularly advantageous dissipation of heat from the at least one battery cell received in the intake of the cell holder. The at least one battery cell received in the intake of the cell holder can thus be particularly easily cooled by means of the metal component. An overheating of the at least one battery cell received in the intake can additionally be at least substantially prevented by means of the metal component. A respective temperature of several battery cells received in cell holders stacked on top of each other can for example be adjusted to each other, and/or heat can be dissipated from the at least one battery cell received in the intake of the cell holder and supplied to a cooling device, by means of the metal component. The at least one metal component thus enables a particularly advantageous tempering of battery cells received in the intake of the cell holder.

In a development of the invention, it has proved advantageous if on at least one wall delimiting the intake, a heating element, in particular a Peltier element, is arranged, on which the battery cell can abut in its state received in the intake. The battery cell can be heated in its state arranged in the intake by means of the heating element. A minimum temperature of the battery cell arranged in the intake can thus be particularly easily adjusted, whereby a risk of damage to the battery cell can be kept particularly low. The heating element additionally enables a particularly fast adjustment of an operating temperature of the battery cell when the battery cell is operated, whereby the battery cell can be used in a particularly energy efficient and fast manner. A risk of damage to the battery cell can be kept particularly low by means of the heating element of the cell holder via the quick adjustment of the operating temperature, whereby a particularly high lifespan of the battery cell can be obtained, and a particularly advantageous operation of the at least one battery cell received in the intake can additionally be enabled.

The invention further relates to a cell module, having a module frame having at least one guide intake, and having at least two cell holders as they have already been described in connection with the cell holder according to the invention. The cell holders are held on the module frame stacked on top of one another in a stacking direction. The cell holders can be guided in the at least one guide intake of the module frame relative to the module frame along the stacking direction by means of their guiding devices. At least one battery cell can respectively be received in the intakes of the cell holder. A battery cell received in a first cell holder abuts on a back wall of the second cell holder that is stacked on the first cell holder in the stacking direction due to the stacked arrangement of the cell holders in the module frame. The at least one battery cell is thus arranged in the intake of the first cell holder and is covered by the back wall of the second cell holder in the stacking direction. The at least one battery cell is consequently at least substantially enclosed by the first cell holder and the second cell holder when it is arranged in the intake of the first cell holder, covered at least upwards and downwards in the stacking direction.

The guiding devices form a sliding guide with the guide intake, for example, in particular a dovetail connection. The module frame can have at least one guiding nut as a guide intake, in which respective guiding elements of the guiding devices of the cell holder can engage, in particular in a form-fit manner. The cell holders can be individually moved over the guiding devices along the stacking direction relative to the module frame, whereby a spacing between the cell holders can be adjusted. The spacing between the respective cell holders in the stacking direction can be adjusted depending on a respective volume of battery cells received in the cell holders, whereby a pressure load of the battery cells can be kept particularly low. The movement of the cell holders relative to one another along the stacking direction in particular enables the cell holders to be avoided when a volume of at least one of the battery cells increases, whereby a risk of damage to the battery cells received in the cell holders can be kept particularly low. The cell module thus enables a particularly high lifespan of the battery cells, as the cell module enables a change of volume of the battery cells in the event of a particularly low mechanical requirement of the battery cells.

It has proved particularly advantageous if the metal component abuts on a first side of the back wall of the first cell holder, wherein a battery cell received in the second cell holder can abut on a second side of the back wall opposite the first side. This means that the metal component is arranged in the stacking direction, overlapping at least one intake of a cell holder, whereby a battery cell arranged in the intake of the cell holder can be arranged in the stacking direction overlapping with the metal component and abutting on the latter. The metal component enables a dispersal of heat from the battery cell that is received in the intake delimited by the metal component, and that abuts on the metal component. The heat received by means of the metal component can be dissipated in the stacking direction of the intake or the battery cell via the back wall. If at least one battery cell is respectively arranged in several stacking directions of cell holders arranged on top of one another, then a temperature balancing between the battery cells can occur via at least one metal component that is arranged between respective battery cells in the stacking direction. Temperature spikes within the cell module can thus be at least substantially avoided or balanced and levelled particularly quickly. An overheating of the cell module can thus be particularly advantageously prevented. A danger of damage for the cell module can thus be kept particularly low.

In a further embodiment of the invention, it has proved advantageous if a cooling device is provided that abuts on the stacked cell holders, and by means of which heat can be gathered from the cell holders. The cooling device in particular abuts on all cell holders stacked in the stacking direction simultaneously. For this purpose, the cooling device can abut on the outside of respective base walls delimiting the intakes of the cell holders perpendicular to the stacking direction. The cell module can particularly advantageously be cooled by means of the cooling device, as the heat is directly gathered from the respective cell holders. The cooling device enables a particularly advantageous even cooling of the cell module, whereby overheating and temperature spikes in the cell module can be at least substantially avoided. A heating device can simultaneously abut on all stacked cell holders alternatively or additionally to the cooling device, by means of which the cell holders can be heated, whereby received battery cells can be heated in respective intakes of the cell holders. The battery cells received in the intakes of the cell holders can thus be heated up to an operating temperature and/or to a minimum temperature, whereby a danger of damage for the battery cells received in the cell module can be kept particularly low.

It has proved particularly advantageous if the metal component is arranged on the base wall of at least one of the cell holders, facing the cooling device. The metal component here abuts on a first side of the base wall facing the intake. The cooling device abuts on the cell holder on an outer second side of the base wall opposite the first side. The base wall can alternatively be formed via the metal component. The metal component enables a particularly advantageous dissipation of heat from the at least one battery cell received in the intake to the cooling device, whereby a particularly efficient cooling of the at least one battery cell received in the intake can occur.

Further advantages, features and details of the invention result from the following description of a preferred exemplary embodiment and with the assistance of the drawings.

The features and combinations of features given previously in the description, and the features and combinations of features given in the following description of figures and/or shown in the figures alone can be used not only in the respectively given combinations, but also in other combinations or in isolation without leaving the scope of the invention.

DETAILED DESCRIPTION OF THE DRAWINGS

Figure 1:
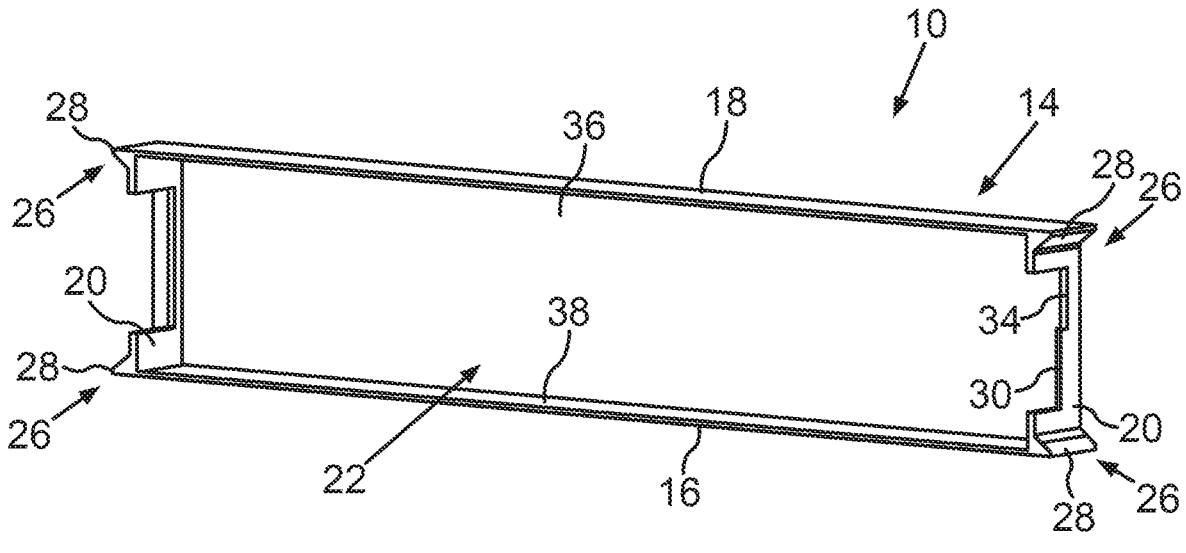
FIG. 1 shows a schematic perspective view of a cell holder for at least one battery cell that can be stacked with further cell holders and can be connected to a cell module.

In FIG. 1, a cell holder 10 by means of which at least one battery cell 12 can be received is shown. The cell holder 10 thus provides a cell envelope for at least one battery cell 12, and is equipped to fix the at least one battery cell 12. The cell holder 10 is here formed from a polymer, and can thus also be described as a polymer cell case. The cell holder 10 is here produced in an injection moulding procedure, such that the cell holder 10 is an injection moulding part. The cell holder 10 has a back wall 14, a base wall 16, a ceiling wall 18 and two side walls 20 that together delimit an intake 22. The base wall 16 and the ceiling wall 18 delimit the intake 22 on respective opposite sides. The side walls 20 further delimit the intake 22 on respective opposite sides. The intake 22 is formed open on a side opposite the back wall 14. The at least one battery cell 12 can be received in the intake 22, wherein the at least one battery cell 12 is stabilized via the walls 14, 16, 18, 20 and protected from damage.

Figure 2:
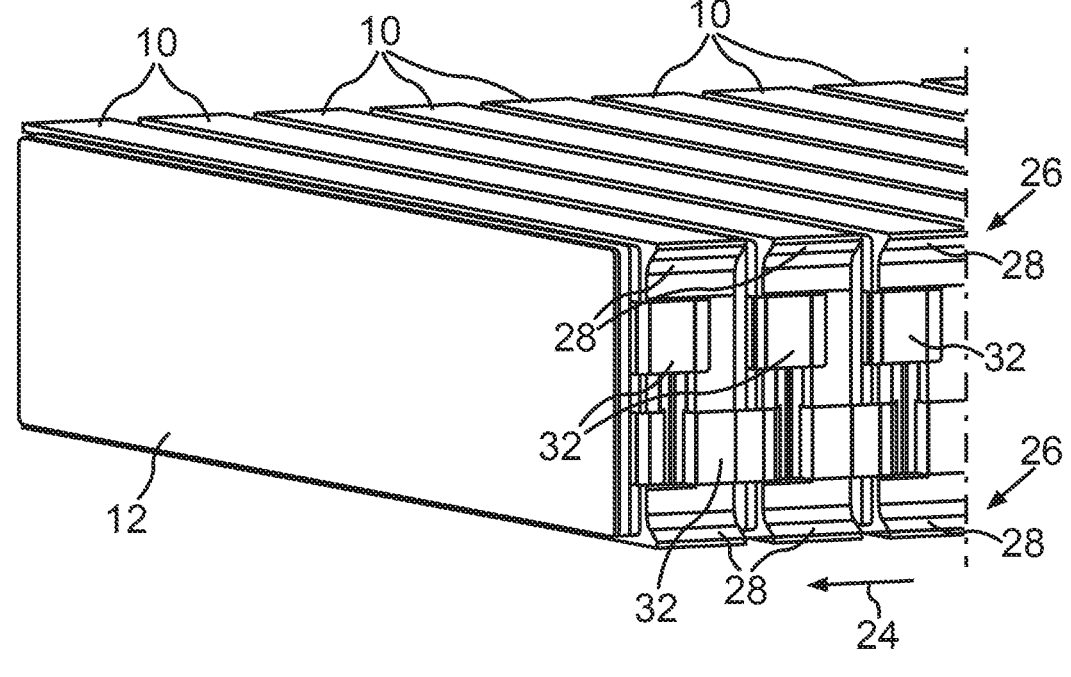
FIG. 2 shows a schematic perspective view of several stacked cell holders, in each of which at least one battery cell is received, wherein the stacked cell holders can be received in a module frame as a cell block, the module frame and cell block forming a cell module together.

As shown in FIG. 2, several cell holders 10 can be stacked on top of one another in a stacking direction 24 in order to provide a cell module. At least one battery cell 12 can be received in each cell holder 10. The respective intake 22 of a first cell holder 10 can be limited by stacking the cell holder 10 in the stacking direction 24 on the side, opposite the first back wall 14 of the first cell holder 10, of a second back wall 14 of a second cell holder 10 which is stacked on top of the first cell holder 10 in the stacking direction 24. A battery cell 12 received in a first intake 22 in the first cell holder 10 can thus be particularly advantageously enclosed by the first cell holder 10 and the second cell holder 10 in the stacked state of the cell holders 10. In addition to the several cell holders 10, the cell module comprises a module frame (not shown in the figures) on which the cell holders 10 are held, in order to be able to keep the cell holders stacked on top of one another. The module frame is in particular formed of a metal. The cell holder 10 takes over a guiding task for the battery cell 12 received in the intake 22 relative to the module frame. The several cell holders 10 can be connected to the cell module with the module frame, wherein several cell modules can be connected to a battery in turn. For this purpose, the several battery cells 12 can be interconnected with one another in the cell module, and the several cell modules can be interconnected with one another in turn.

The battery cells 12 that can be received in the cell holders 10 are here lithium-ion battery cells. An electrochemically active electrode material located inside the battery cells 12 changes its thickness via its charging state and its lifespan. A typical value for a thickness growth when charging the battery cell 12 with lithium metal anodes is approximately 15% during a charging from a charging state of 0% to 100%. A typical value for a thickness growth when the battery cells 12 age via solid-state cell chemistry or conventional lithium-ion cell chemistry is approximately 5% over its entire lifespan. A thickness change of approximately 20% in total of the battery cell 12 thus needs to be compensated for, for example.

Elastic spring elements such as foam mats or coil springs are arranged in and/or between the battery cells 12 in the state of the art for a compensation of a thickness change of the battery cells 12 of this kind. An inherent increase of a pressing force in the case of battery cells 12 expanding due to a spring characteristic curve of the spring elements is here disadvantageous, such that the battery cell 12 or the entire cell module are subject to particularly high axial forces in the direction of the thickness change.

Each cell holder 10 has a guiding device 26 in order to enable a thickness change of battery cells 12 received via cell holders 10, and to be able to keep a force on the battery cells 12 and/or the entire cell module in the stacking direction 24 particularly low. The cell holders 10 are held on the module frame moveably in the stacking direction 24 relative to the module frame by means of the guiding device 26. The guiding devices 26 of the cell holders 10 additionally enable a movement of the cell holders 10 relative to each other in the stacking direction 24, whereby a thickness change of the battery cell 12 received in the intake 22 is enabled via the respective open side of the intake 22 opposite the back wall 14 of the respective cell holder 10. The respective guiding devices 26 here each comprise two guiding elements 28 arranged on every side wall 20 of the cell holder 10. The respective guiding elements 28 arranged on a side surface 20 provide a dovetail shape together that enables a dovetail guide of the guiding device 26 in a guide intake of the module frame. This dovetail guide means that the guiding device 26 does not jam in the guide intake of the module frame when a heat expansion occurs, but opens before jamming in the event of the heat expansion, and thus the guiding devices 26 are released from the guide intake.

As a result of the receipt of the battery cells 12 in the respective cell holders 10, the battery cells 12 experience a contacted movement relative only to the cell holder 10 during their volume change, for example following a charging or discharging. A pouch foil enclosing the electrochemically active electrode material can thus be protected from damage.

Each cell holder 10 has at least one bending edge 30, around which at least one cell tab 32 of the battery cell 12 arranged in the intake 22 can be bent, in order to be able to interconnect the respective battery cells 12 to each other in a cell module in a particularly advantageous manner. Via the bending of the cell tab 32 around the bending edge 30, respective tabs 32 of different battery cells 12 that are received in cell holders 10 that are different to one another can be brought into overlap with one another in order to be in electrical contact with one another. An interconnection of the battery cells 12 received in a cell module in respective cell holders 10 can thus occur. A lateral metal insert 34 is provided on the bending edge 30 in order to enable a particularly secure fixing of the respective battery cell 12 received in the intake 22 on the cell holder 10. The at least one cell tab 32 of the battery cell 12 can be welded to the metal insert 34 of the cell holder 10, whereby the cell tab 32 can be fixed on the bending edge 30. The battery cells 12 received in the stacked cell holders 10 can be particularly easily connected and interconnected to one another via the respective cell tabs 32, wherein the battery cells 12 can be interconnected in a series connection or in a parallel connection.

A first metal component 36 is arranged on the back wall 14 on a side facing the intake 22 in order to enable a particularly advantageous tempering of a battery cell 12 received in the intake 22 of the cell holder 10. The first metal component 36 here covers the entire back wall 14 to the intake 22. The first metal component 36 consequently delimits the intake 22. Heat can be gathered from or delivered to a battery cell 12 arranged in the intake 22 and abutting on the first metal component 36 by means of the first metal component 36. The heat gathered from the battery cell 12 arranged in the first intake 22 of the first cell holder 10 by means of the first metal component 36 is delivered to a further battery cell 12 abutting on the first back wall 14 via the first back wall 14 of the first cell holder 10, wherein the further battery cell is arranged in a second intake 22 of the second cell holder 10 that is stacked on the first cell holder 10 in the stacking direction 24. A heat exchange between the battery cells 12 received by the first cell holder 10 and the second cell holder 10 can thus occur via the first metal component 36. A foil having at least one, in particular a plurality of heating elements, here Peltier elements, can be arranged on the back wall 14 facing the intake 22 alternatively or additionally to the first metal component 36. The foil can here cover the back wall 14 completely up to the intake 22. The intake 22, and consequently a battery cell 12 received in the intake 22, can be heated by means of the heating elements. The Peltier elements thus enable a heating function that allows the battery cells 12 received in the intake 22 to be heated, whereby the battery cell 12 arranged in the intake 22 can be brought into a region of a particularly advantageous conductivity.

The cell holder 10 here comprises a second metal component 38 that is arranged on the base wall 16 facing the intake 22. The second metal component 38 here covers the base wall 16 completely up to the intake 22. By means of the second metal component 38, heat can particularly advantageously be received from the battery cell 12 arranged in the intake 22, and can be delivered via the base wall 16 due to a particularly high conductivity of a respective metal component. The cell module can in particular comprise a cooling device that is abutted on the cell holder 10 on a side of the base wall 16 facing away from the intake 22. The cooling device is in particular abutted on all of the stacked cell holders 10 on their respective base walls 16. The second metal component 38 enables a particularly advantageous heat dissipation from the battery cell 12 received in the intake 22 to the cooling device via the base wall 16. The cell module can be particularly evenly cooled by means of the cooling device. A particularly advantageous thermal connection between the battery cell 12 received in the intake 22 and the base wall 16 can occur by means of the second metal component 38. The second metal component 38 thus enables a particularly advantageous thermal contact between battery cell 12 received in the intake 22 and the cooling device, which is in particular a base cooling.

The cell holders 10 enable a capture of a relative movement of the battery cells 12 that is caused by a volume change of the battery cells 12, whereby a pouch foil of the respective battery cells 12 can be protected. An abrasion of the pouch foils of the battery cells 12, which can lead to holes in the pouch foils, can thus be at least substantially avoided. The respective pouch foils of the battery cells 12 received in the intakes 22 are thus protected from friction and material abrasion by means of the cell holders 10. A thermal connection of the battery cells 12 to the cooling device can be ensured via the metal components 36, 38. A cell heating can be integrated in the cell holders 10 via the foil comprising the heating elements, which is particularly advantageous in the case of cell chemistries of battery cells 12 that require a minimum operating temperature. The bending edge 30 of the respective cell holder 10 enables the cell tabs 32 to be bent directly on the cell holder 10, whereby particularly few mounting steps are required for bending. The cell tabs 32 of the respective battery cells 12 received in the intakes 22 can be directly welded to the metal insert 34 embedded in the side wall 20, which is here a metal platelet. The cell tab 32 can thus be directly connected to the cell holder 10 and fixed to the latter. Cell clips can thus be spared. The cell holder 10 enables several battery cells 12 of a cell module to be connected to one another in a particularly simple and cost-effective manner, and additionally to be fixed to the respective assigned cell holders 10 in a particularly simple and cost-effective manner.

Overall, the invention shows how a cell case having guide, tab fixing, thermal application and heating can be provided.

LIST OF REFERENCE CHARACTERS

10 cell holder
12 battery cell
14 back wall
16 base wall
18 ceiling wall
20 side wall
22 intake
24 stacking direction
26 guiding device
28 guiding element
30 bending edge
32 cell tab
34 metal insert
36 first metal component
38 second metal component

The invention claimed is:

1. A cell holder (10), comprising:
a battery cell (12);
an intake (22) in which the battery cell (12) is disposed;
wherein the cell holder is stackable with additional cell holders (10) in a module frame;
a guiding device (26) disposed on a side wall (20) of the cell holder (10), wherein the cell holder (10) is guidable in the module frame relative to the module frame by the guiding device (26); and
a bending edge (30) disposed on the side wall (20), wherein a cell tab (32) of the battery cell (12) is bent around the bending edge (30);
wherein a lateral metal insert (34) is provided on the bending edge (30), wherein the lateral metal insert (34) is formed in the side wall (20), and wherein the cell tab (32) abuts on the lateral metal insert (34) and is welded to the lateral metal insert (34).

2. The cell holder (10) according to claim 1, wherein the guiding device (26) is a dovetail guide.

3. The cell holder (10) according to claim 1, further comprising a metal component with a wall, wherein the wall delimits the intake (22) and the battery cell (12) abuts the metal component.

4. The cell holder (10) according to claim 1, further comprising a heating element disposed on a wall that delimits the intake (22), wherein the battery cell (12) abuts the heating element.

5. A cell module, comprising:

a module frame, wherein the module frame has a guide intake; and at least two cell holders (10) according to claim 1 that are held on the module frame stacked on top of one another in a stacking direction (24);

wherein the at least two cell holders (10) are guidable along the stacking direction in the guide intake relative to the module frame by the respective guiding devices (26) of the at least two cell holders (10).

6. The cell module according to claim 5, further comprising a metal component (36) that abuts on a first side of a back wall (14) of a first cell holder (10) of the at least two cell holders (10), wherein a battery cell (12) disposed in a second cell holder (10) of the at least two cell holders (10) abuts on a second side of the back wall (14) opposite the first side.

7. The cell holder according to claim 5, further comprising a cooling device that abuts on the at least two cell holders (10), wherein heat is gatherable from the at least two cell holders (10) by the cooling device.

8. The cell module according to claim 7, further comprising a metal component (36), wherein the metal component (36) is disposed on a base wall (16) of one of the at least two cell holders (10) that abuts the cooling device.

* * * * *